(12) United States Patent
Shetty et al.

(10) Patent No.: US 8,874,157 B1
(45) Date of Patent: Oct. 28, 2014

(54) SCHEDULING WIRELESS COMMUNICATION POWER RESOURCES IN WIRELESS COMMUNICATION SYSTEMS

(75) Inventors: Manoj Shetty, Overland Park, KS (US); Michael Kevin Hannigan, Falls Church, VA (US); Ramesh Kalathur, Fairfax, VA (US); Brett L. Christian, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 454 days.

(21) Appl. No.: 13/207,996

(22) Filed: Aug. 11, 2011

(51) Int. Cl.
*H04B 7/00* (2006.01)

(52) U.S. Cl.
USPC .......................... 455/512; 455/450; 455/422

(58) Field of Classification Search
None
See application file for complete search history.

(56) References Cited

U.S. PATENT DOCUMENTS

| 6,597,682 | B1 * | 7/2003 | Kari ............................... 370/348 |
| 7,782,900 | B2 | 8/2010 | Bachl et al. |
| 2008/0025254 | A1 | 1/2008 | Love et al. |
| 2009/0135787 | A1 * | 5/2009 | Uemura et al. ............... 370/335 |
| 2010/0113050 | A1 | 5/2010 | Cheng et al. |
| 2010/0239031 | A1 * | 9/2010 | Wallen ........................ 375/260 |
| 2011/0136494 | A1 * | 6/2011 | Kim et al. ..................... 455/450 |
| 2012/0134267 | A1 * | 5/2012 | Noriega et al. ............... 370/230 |

FOREIGN PATENT DOCUMENTS

| WO | WO 2009136825 A1 * | 11/2009 |
| WO | WO 2010118983 A1 * | 10/2010 |
| WO | WO 2011063852 A1 * | 6/2011 |

* cited by examiner

*Primary Examiner* — Fayyaz Alam
*Assistant Examiner* — Mohammed Rachedine

(57) ABSTRACT

A method of operating a wireless communication system is disclosed. The method includes receiving power status information for resource blocks of a plurality of wireless links, where the resource blocks comprise frequency apportioned timeslots used for exchanging wireless communications between wireless access nodes and user devices. The method also includes processing the power status information to identify ones of the resource blocks which exceed a power threshold, determining scheduling instructions for the resource blocks to reduce the power status information for the ones of the resource blocks to below the power threshold, and transferring the scheduling instructions to at least a first wireless access node for controlling a first wireless link based on the scheduling instructions.

18 Claims, 6 Drawing Sheets

SCHEDULING WIRELESS COMMUNICATION POWER RESOURCES IN WIRELESS COMMUNICATION SYSTEMS

TECHNICAL FIELD

Aspects of the disclosure are related to the field of communications, and in particular, scheduling and allocating of power resources for wireless links in wireless communication systems.

TECHNICAL BACKGROUND

Wireless communication systems provide wireless access to communication services for user devices, such as cellular voice and data phones. The wireless access is typically provided through geographically distributed wireless access nodes, such as base stations, which provide wireless links for the user devices to access the communication services. The wireless links can employ various wireless protocols, such as GSM, CDMA, WiMAX, or LTE, among other common wireless formats and protocols.

Resources of the wireless links can be subdivided into various resource block subdivisions. These resource blocks could represent various portions of the wireless links available for carrying user and overhead communications, such as timeslots, frequencies, channels, or other portions. In some wireless protocols, such as protocols employing Orthogonal Frequency-Division Multiple Access (OFDMA) techniques, these resource blocks are apportioned according to both time and frequency. However, usage of individual resource blocks can exceed power requirements, such as during peak usage times, which can lead to interference with adjacent resource blocks, frequency bands, or communication channels.

Overview

A method of operating a wireless communication system is disclosed. The method includes receiving power status information for resource blocks of a plurality of wireless links, where the resource blocks comprise frequency apportioned timeslots used for exchanging wireless communications between wireless access nodes and user devices. The method also includes processing the power status information to identify ones of the resource blocks which exceed a power threshold, determining scheduling instructions for the resource blocks to reduce the power status information for the ones of the resource blocks to below the power threshold, and transferring the scheduling instructions to at least a first wireless access node for controlling a first wireless link based on the scheduling instructions.

A wireless communication system is also disclosed. The wireless communication system includes a power monitor system configured to receive power status information for resource blocks of a plurality of wireless links, where the resource blocks comprise frequency apportioned timeslots used for exchanging wireless communications between wireless access nodes and user devices. The wireless communication systems also includes a resource scheduling system configured to process the power status information to identify ones of the resource blocks which exceed a power threshold, determine scheduling instructions for the resource blocks to reduce the power status information for the ones of the resource blocks to below the power threshold, and transfer the scheduling instructions to at least a first wireless access node for controlling a first wireless link based on the scheduling instructions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
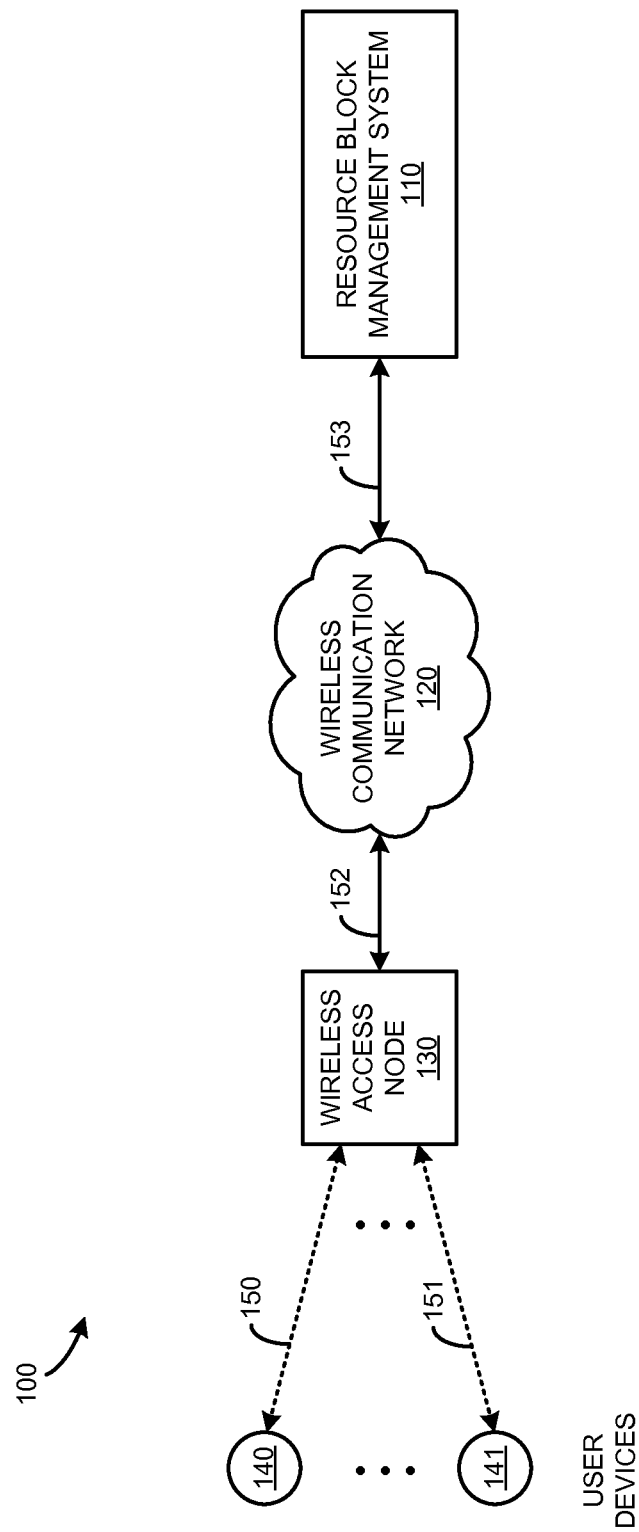
FIG. 1 is a system diagram illustrating a communication system.

FIG. 1 is a system diagram illustrating communication system 100. Communication system 100 includes resource block management system 110, wireless communication network 120, wireless access node 130, and user devices 140-141. User devices 140-141 communicate with wireless access node 130 over associated wireless links 150-151. Wireless access node 130 and wireless communication network 120 communicate over link 152. Wireless communication network 120 and resource block management system 110 communicate over link 153. In FIG. 1, user devices 140-141 each receive wireless access to communication services over associated wireless links 150-151 through wireless access node 130. Although two wireless links and two user devices are shown in FIG. 1 for clarity, it should be understood that a different number of user devices or wireless links could have been included. For example, user devices 140-141 could share a wireless link or various resources of a wireless link. The communication services could be communication services provided by wireless communication network 120, such as voice calls, text messaging, data access, or other communication services.

Figure 2:
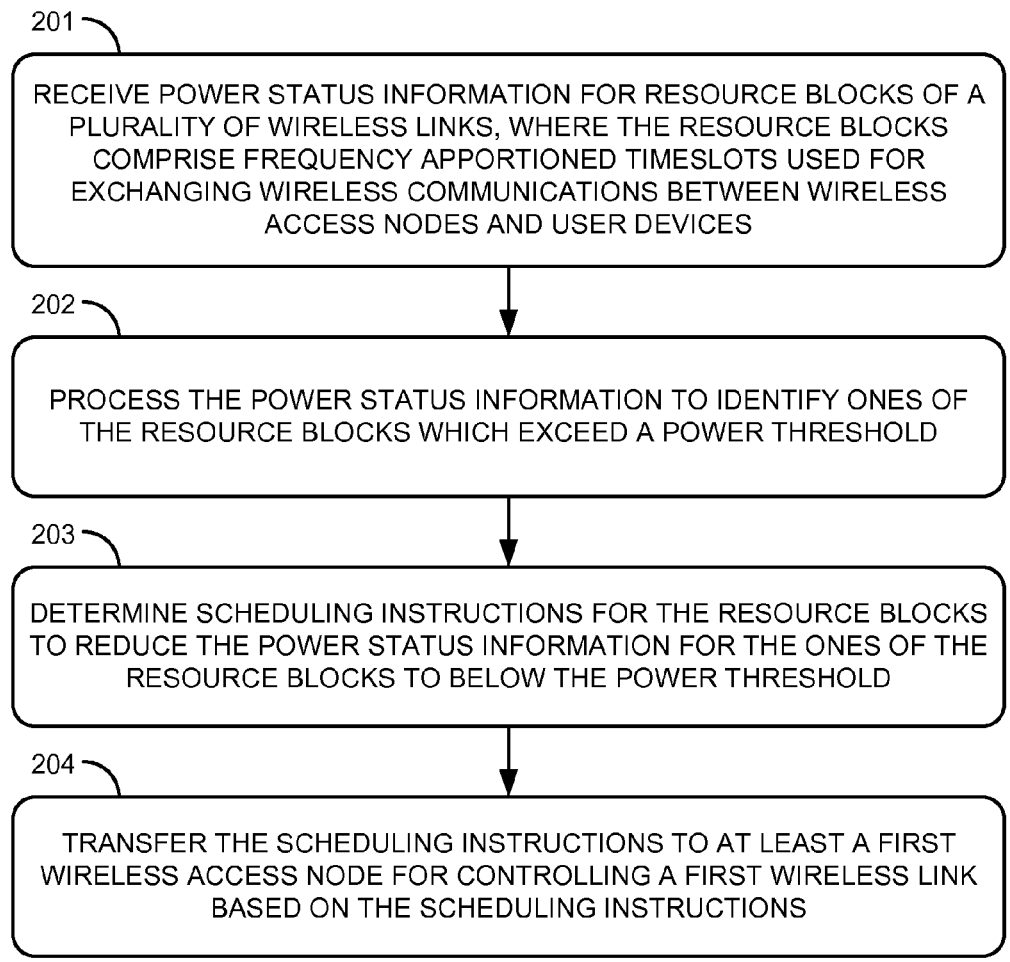
FIG. 2 is a flow diagram illustrating a method of operation of a communication system.

FIG. 2 is a flow diagram illustrating a method of operation of wireless communication system 100. The operations of FIG. 2 are referenced herein parenthetically. In FIG. 2, resource block management system 110 receives (201) power status information for resource blocks of a plurality of wireless links, where the resource blocks comprise frequency apportioned timeslots used for exchanging wireless communications between wireless access nodes and user devices.

Resources of each of wireless links 150-151 can be subdivided into various logical resource blocks. These resource blocks could represent various portions of wireless links 150-151 available for carrying user and overhead communications, such as timeslots, frequencies, channels, or other portions. The identification of individual resource blocks could be common across multiple wireless links, such as when a particular frequency spectrum is reused over multiple wireless access nodes or wireless links. In some wireless protocols, resource blocks are apportioned according to multiple parameters, such as both time and frequency, or spreading code and time, among others. In this example, the resource blocks represent frequency apportioned timeslots, where wireless communications occur in small blocks or segments during assigned timeslots over a particular frequency channel. Multiple frequency channels could each be multiplexed in a time-wise manner to create the resource blocks. In this example, the amount of data transferred in a particular resource block is generally determined by the duration of the timeslot and the bandwidth of the frequency channel.

The power status information reflects a state of the radio frequency (RF) power, or other indicator associated with power status, as detected for each resource block. For example, power detected during a particular resource block could indicate power status for that particular resource block. The power status could also indicate an activity level for a resource block. The power could be detected by wireless access node 130, or other equipment and systems of wireless communication network 120, and could be an instantaneous power or average power. In some examples, the power status information is averaged over multiple resource blocks, or over multiple timeslots for a particular frequency channel. The power status information could indicate a detected power in decibels (dB), watts, or could be indirectly determined from a data transfer rate, data usage, distance from a detector, or other determination. In some examples, the power status information is transferred for delivery to resource block management system 110 by each wireless access node associated with wireless communication network 120, while in other examples, the power status information is aggregated across various wireless access nodes by equipment of wireless communication network 120 and subsequently transferred in a data structure for delivery to resource block management system 110.

Resource block management system 110 processes (202) the power status information to identify ones of the resource blocks which exceed a power threshold. The power status information for each resource block is analyzed to determine which ones of the resource blocks exceed the power threshold. Exceeding the power threshold indicates when detected power for a resource block falls outside of an acceptable or desired power level. The power threshold could indicate a regulatory limit on power emission by a user device, such as an FCC-imposed power limit. In other examples, the power threshold is determined by operational preferences of wireless access node 130 or wireless communication network 120, and could be predetermined based on a desired power for each resource block. As indicated above, the resource blocks could be analyzed for many wireless access nodes across a wireless communication network.

Resource block management system 110 determines (203) scheduling instructions for the resource blocks to reduce the power status information for the ones of the resource blocks to below the power threshold. In some examples, the scheduling instructions indicate a reduced activity or power output for a first user device using a first resource block of a first wireless link, where the first resource block was determined to exceed the power threshold. In other examples, an activity level or power output of a first user device using a first resource block of a first wireless link is offset by determining scheduling instructions that reduce an activity level or power output for a second user device using the first resource block at a second wireless link. The first and second wireless links could be located in different locations, such as different sectors, wireless access nodes, cities, or regions. Thus, resource block management system 110 could determine scheduling instructions to apportion a power threshold among multiple similarly identified resource blocks of many wireless links, so that an average detected power or activity level of a particular resource block over multiple wireless links does not exceed the power threshold.

Resource block management system 110 transfers (204) the scheduling instructions to at least a first wireless access node for controlling a first wireless link based on the scheduling instructions. The scheduling instructions are transferred to wireless access node 130 for scheduling the resources of wireless links 150-151. For example, if user device 140 using resource block 'A' of wireless link 150 exceeds the power threshold, then the scheduling instructions could be transferred to wireless access node 130 for reducing an activity level or power output employed by user device 140 over resource block 'A' of wireless link 150. In other examples, if user device 140 using resource block 'A' of wireless link 150 exceeds the power threshold, then the scheduling instructions could be transferred to wireless access node 130 for reducing an activity level or power output employed by user device 141 over resource block 'A' of wireless link 151. Wireless link 150 and wireless link 151 could be in different sectors of wireless access node 130. The scheduling instructions can include information for scheduling activity in each affected resource block, such as identifying a resource block and including a target reduction in power or activity level for the resource block. Other information could be included, such as identifiers for user devices using the resource blocks, geographic locations, or start times and time durations for the scheduling instructions, among other information.

Figure 3:
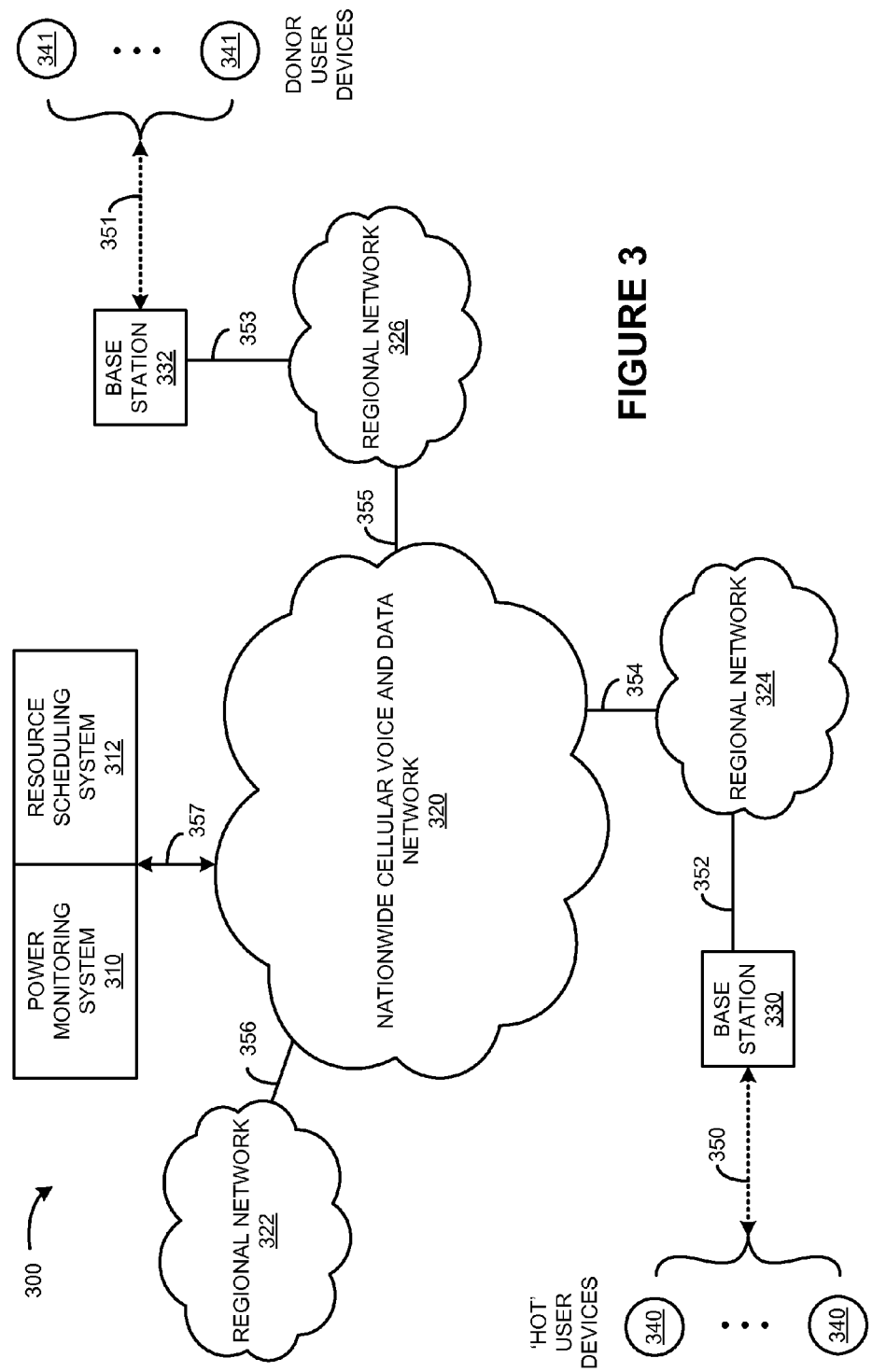
FIG. 3 is a system diagram illustrating a communication system.

FIG. 3 is a system diagram illustrating communication system 300. Communication system 300 includes power monitoring system 310, resource scheduling system 312, nationwide cellular voice and data network 320, regional networks 322-326, base stations 330-332, 'hot' user devices 340, and donor user devices 341. Power monitoring system 310, resource scheduling system 312, and nationwide cellular voice and data network 320 communicate over link 357, which is an Internet protocol (IP) networking link capable of carrying packetized communications in this example. Nationwide cellular voice and data network 320 and each of regional networks 322-326 communicate over associated links 354-356, which are optical long-haul networking links in this example, such as SONET links capable of carrying IP traffic. Base station 330 and regional network 324 communicate over backhaul link 352, which is a T1 link in this example. Base station 332 and regional network 326 communicate over backhaul link 353, which is a T1 link in this example. Hot user devices 340 and base station 330 communicate over wireless link 350, which is a Long Term Evolution (LTE) wireless link in this example. Donor user devices 341 and base station 332 communicate over wireless link 351, which is a LTE wireless link in this example.

Power monitoring system 310 includes equipment and systems to accumulate and monitor power status information for resource blocks across a wireless communication network, such as nationwide cellular voice and data network 320. Power monitoring system 310 receives power status information over link 357 as detected by individual wireless access nodes, such as by base stations 330-332. Power monitoring system 310 comprises communication interfaces, computer systems, microprocessors, circuitry, computer-readable media, or other processing devices or software systems, and may be distributed among multiple processing devices. Power monitoring system 310 could be included in the equipment or systems of nationwide cellular voice and data network 320, or could be included in separate equipment or systems. Examples of power monitoring system 310 may also include software such as an operating system, logs, utilities, drivers, networking software, and other software stored on a computer-readable medium. Power monitoring system 310 could also include an application server, database system, web server, or other systems.

Resource scheduling system 312 receives power status information from power monitoring system 310 for various resource blocks across a wireless communication network, such as of nationwide cellular voice and data network 320. Resource scheduling system 312 determines scheduling instructions for various wireless links of individual wireless access nodes, such as base stations 330-332. Resource scheduling system 312 comprises communication interfaces, computer systems, microprocessors, circuitry, computer-readable media, or other processing devices or software systems, and may be distributed among multiple processing devices. Resource scheduling system 312 could be included in the equipment or systems of nationwide cellular voice and data network 320, or could be included in separate equipment or systems. Examples of resource scheduling system 312 may also include software such as an operating system, logs, utilities, drivers, networking software, and other software stored on a computer-readable medium. Resource scheduling system 312 could also include an application server, database system, web server, or other systems. Although power monitoring system 310 and resource scheduling system 312 are shown as separate entities in FIG. 3, it should be understood that the functionality could be included in similar equipment and systems.

Nationwide cellular voice and data network 320, in conjunction with regional networks 322-326, comprises communication and control systems for providing wireless access to communication services for wireless communication devices across a large geographic region including many cities. In this example, nationwide cellular voice and data network 320 comprises a distributed communication routing system, such as communication backbones, communication links, routers, switches, bridges, or other communication equipment to communicatively couple each of regional networks 322-326. Each of regional networks 322-326 include equipment to provide wireless access to communication services within different coverage areas to user devices, route communications between content providers and user devices, and receive registration and content requests, among other operations. Each of regional networks 322-326 may also comprise base stations, base transceiver stations (BTS), base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

User devices 340-341 each comprise transceiver circuitry and communication elements, and are each mobile smartphones in this example. User device 340-341 receive access to wireless services of nationwide cellular voice and data network 320 through associated ones of base stations 330-332. Base stations 330-332 each provide wireless access over associated wireless links 350-351.

Figure 4:
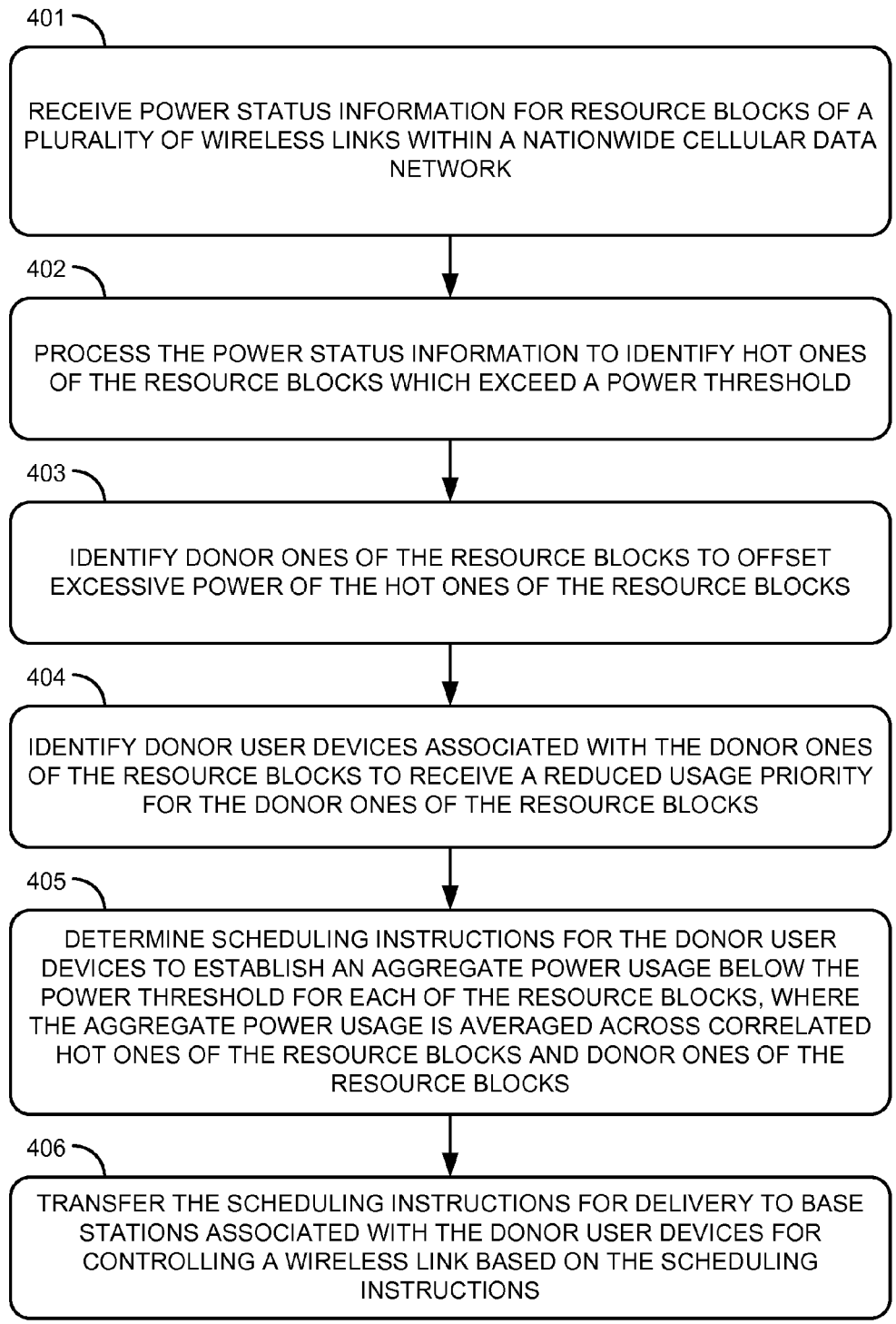
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, power monitoring system 310 receives (401) power status information for resource blocks of a plurality of wireless links within nationwide cellular voice and data network 320. In this example, the plurality of wireless links includes wireless links 350-351, although other wireless links could be included. In FIG. 3, wireless links 350-351 are partially managed by elements of nationwide cellular voice and data network 320, such as by power monitoring system 310 and resource scheduling system 312, and partially managed by associated base stations 330-332.

Resources of each of wireless links 350-351 can be logically subdivided into resource blocks. These resource blocks represent various portions of wireless links 350-351 available for exchanging user and overhead communications with user devices. The LTE wireless protocol and spectrum is employed over wireless links 350-351, and the resource blocks represent frequency-apportioned timeslots. In this example, each of wireless links 350-351 use an associated frequency spectrum, which is in this example is associated with the LTE wireless spectrum. The associated frequency spectrum of each of wireless links 350-351 is subdivided into smaller frequency-based portions, or frequency channels, each channel comprising a portion of the larger spectrum. Additionally, each frequency channel is allocated for use during a specific time period, namely a timeslot. Thus, for each of wireless links 350-351, the resource blocks comprise a portion of time during which a particular frequency channel can be used for communications. Also in this example, the individual resource blocks are commonly identified across wireless links 350-351, where the frequency spectrum is reused over each wireless link. Other resource block allotments could be employed, which include timeslots, frequencies, spreading codes, or other portions or subdivisions, including combinations thereof.

The power status information reflects a state of the radio frequency (RF) power as detected for each resource block. In this example, the power of each resource block for each of wireless links 350-351 is detected by the associated base station 330-332. The power detected for each resource block is then transferred by the associated base station 330-332 for delivery to power monitoring system 310. In this example, the power is detected as an averaged power, where the detected power is averaged over multiple commonly numbered timeslots. For example, when the timeslots repeat periodically, then the power detected for each timeslot is averaged against other commonly numbered timeslots for a period of time, such as over 'x' quantity of common timeslots during 'y' cycles of the repeating period. The power status information could indicate a detected power in decibels (dB), watts, or could be indirectly determined from a data transfer rate, data usage, distance from a detector, or other determination. Additionally, the power status information indicates identifiers for the particular resource blocks, such as frequency and timeslot information for each resource block, and may include identifiers of the user devices presently using the particular resource blocks.

Power monitoring system 310 processes (402) the power status information to identify hot ones of the resource blocks which exceed a power threshold. The power status information is received over link 357 as transferred by base stations 330-332, and power monitoring system 310 aggregates and monitors the power status information. In some examples, only a portion of the power status information for wireless links 350-351 is transferred by base stations 330-332, such as only a delta or changed power status information update. Ones of the resource blocks which exceed a power threshold are identified as 'hot'—indicating an excessive detected power for certain resource blocks. The power threshold is determined in part by wireless transmission regulations, such as those promulgated by the Federal Communications Commission (FCC) for maximum transmitted power for particular frequencies. The power threshold could also incorporate operating preferences of nationwide cellular voice and data network 320, such as due to geographic concerns, placement of base stations, sector sizing, inter-cell interference, or performance of user devices, among other concerns. The power threshold thus represents a maximum desired detected power for each of the resource blocks, which could incorporate many power level preferences or regulations. In examples where the power status information indicates detected power of resource blocks in units of decibels (dB), then the power threshold could accordingly indicate a maximum desired power in dB.

Resource scheduling system 312 identifies (403) donor ones of the resource blocks to offset excessive power of the hot ones of the resource blocks. Power monitoring system 310 reports hot ones of the resource blocks to resource scheduling system 312, as determined in operation 402. Resource scheduling system 312 then identifies donor resource blocks from among all resource blocks associated with nationwide cellular voice and data network 320. The donor resource blocks in this example are resource blocks associated with the same frequency channel but which have available power headroom in the difference between the detected power and the 'hot' power threshold. The donor resource blocks are also selected from different wireless links than the hot resource blocks. In FIG. 3, wireless link 350 has at least one hot resource block identified for a particular frequency channel and timeslot, and a donor resource block is identified from another wireless link, namely wireless link 351. The donor resource block of wireless link 351 is identified as the same frequency channel and timeslot as the hot resource block of wireless link 350, but instead is associated with wireless link 351. Additional hot resource blocks and donor resource blocks could be identified for wireless links 350-351. Thus, the low detected power of the donor resource block will be used to offset the excessive detected power of hot resource block, and are selected across different wireless links. The different wireless links in this example, are associated with different base stations, as well as different regional networks, which could include different cities. It should be understood that donor resource blocks could instead be selected in a similar city, or similar base station, but from a different sector of wireless coverage of the same city or base station. In further examples, power monitoring system 310 or resource scheduling system 312 also monitors for resource blocks which are 'cool'—such as those which have a detected power under a 'cool' power threshold. The cool power threshold could be lower than the hot power threshold. In some examples, 'cool' resource blocks are selected as donor resource blocks, where the donor resource blocks are selected as having a detected power below a donor power threshold.

Resource scheduling system 312 identifies (404) donor user devices associated with the donor ones of the resource blocks to receive a reduced usage priority for the donor ones of the resource blocks. User devices are typically assigned by a base station to exchange communications using particular resource blocks. These resource blocks could include multiple assigned user devices, or could be assigned to only a single user device. In this example, ones of donor user devices 341 are identified which correspond to the donor resource block or blocks as determined in operation 403. If multiple user devices are associated with a particular resource block, then a subset of the multiple user devices could be identified. The user devices identified among user devices 341 as donors are thus ones selected to receive a reduced usage priority. The reduced usage priority could include a reduced allowed transmit power, reduced data exchange rate, reduced number of timeslots assigned for exchanging communications, reduced frequency channel allotment, lower quality spreading code, reduced coding rate, or other reductions. In addition to, or alternatively from, the reduced usage priority, a donor user device could be determined to change from communicating over a first resource block to instead communicating over a second resource block, such as by determining a different timeslot or frequency channel for the donor user device. The first resource block would typically be the donor resource block, and the second resource block would be a new or differently assigned resource block for the donor user device.

Resource scheduling system 312 determines (405) scheduling instructions for the donor user devices to establish an aggregate power usage below the power threshold for each of the resource blocks, where the aggregate power usage is averaged across correlated hot ones of the resource blocks and donor ones of the resource blocks. The scheduling instructions include instructions for a base station or a user device to implement the reduced usage priority as determined in operation 404. For example, the scheduling instructions could indicate to donor user devices that a reduced transmit power or reduced data rate is desired. The scheduling instructions could indicate to base stations that a donor user device should be reassigned to a different resource block, or receive reduced usage priority for the donor resource block. The scheduling instructions are determined so as to establish aggregate power usage below the power threshold for corresponding resource blocks of nationwide cellular voice and data network 320. The aggregate power is determined in this example by averaging the power for each particular resource block across the similarly identified or numbered resource blocks of end-user wireless links of nationwide cellular voice and data network 320. Thus, each particular hot one of the resource blocks is averaged with the corresponding donor one of the resource blocks. For example, if wireless link 350 has hot resource block 'A', and wireless link 351 has donor resource block 'A', then the aggregate power is the average power across each resource block 'A' for each wireless link, where the wireless links employ similar frequency spectrums.

Resource scheduling system 312 transfers (406) the scheduling instructions for delivery to base stations associated with the donor user devices for controlling a wireless link based on the scheduling instructions. In this example, the scheduling instructions are transferred over nationwide cellular voice and data network 320 and regional network 326 for delivery to base station 332. The scheduling instructions indicate the reduced usage priority determined for donor user devices 341, and base station 332 would implement the instructions accordingly. In examples where the scheduling instructions are instead for donor user devices 341, then base station 332 would further transfer the scheduling instructions to donor user devices 341. In further examples, user devices associated with hot resource blocks could be identified for reassignment to donor resource blocks within the same wireless link or base station, and scheduling instructions could be determined and transferred to the hot base station or hot user devices. Additionally, hot or donor user devices could be reassigned to a different frequency channel or timeslot based on the power thresholds.

Figure 5:
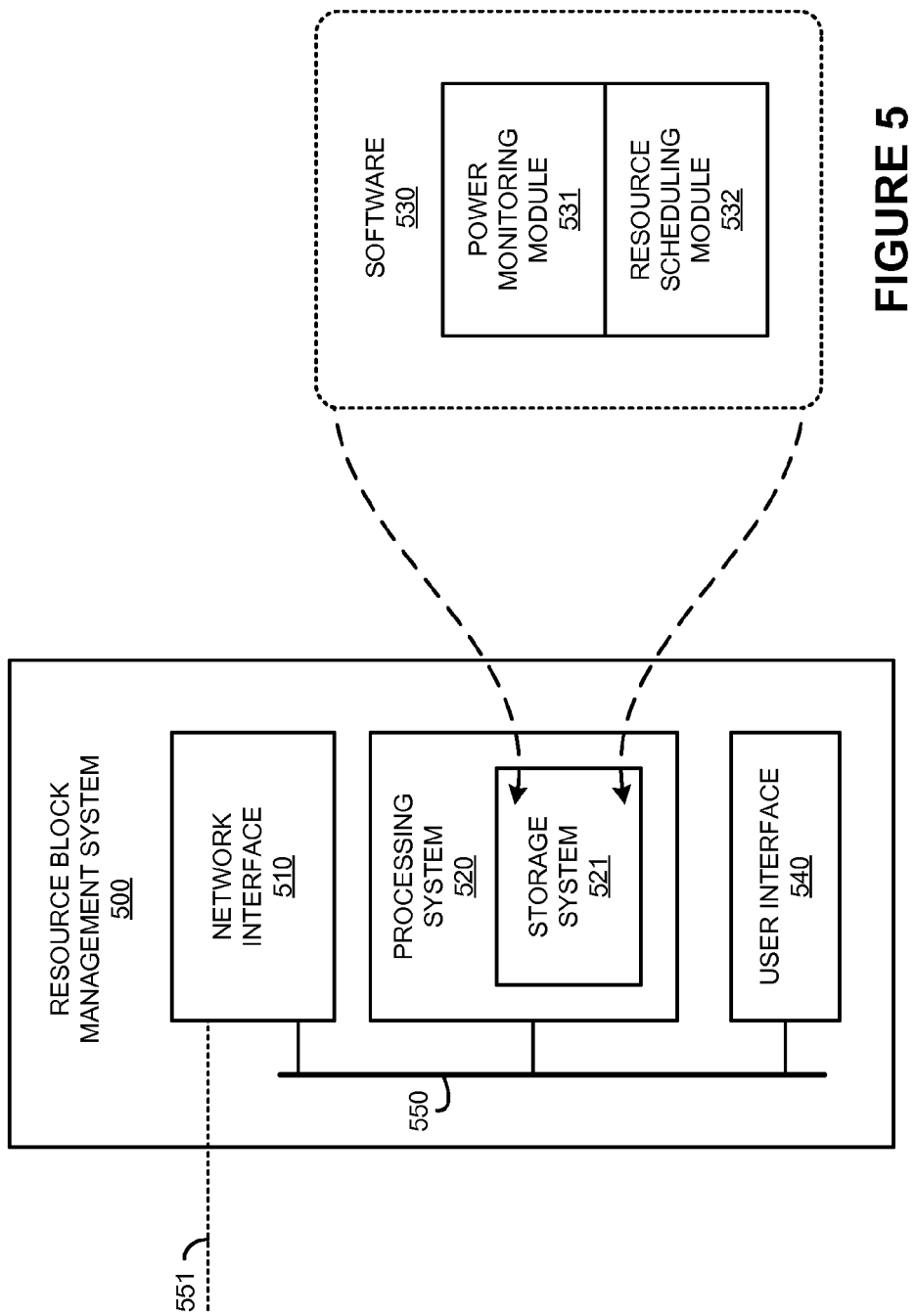
FIG. 5 is a block diagram illustrating a resource block management system.

FIG. 5 is a block diagram illustrating resource block management system 500, as an example of resource block management system 100 found in FIG. 1, or power monitoring system 310 or resource scheduling system 312 found in FIG. 3, although resource block management system 100, power monitoring system 310, or resource scheduling system 312 could use other configurations. Resource block management system 500 includes network interface 510, processing system 520, and user interface 540. Network interface 510, processing system 520, and user interface 540 are shown to communicate over a common bus 550 for illustrative purposes. It should be understood that discrete links could be employed, such as data links, power links, RF links, or other links. Resource block management system 500 may be distributed among multiple devices that together form the elements of FIG. 5.

Network interface 510 comprises network interface, router, and gateway equipment for communicating with wireless communication provider equipment, such as with wireless communication networks, over the Internet, or other communication systems. Network interface 510 exchanges communications over link 551, such as receiving power status information and transferring resource block scheduling information. Link 551 could use various protocols or communication formats as described herein for links 152, 153, or 352-357, including combinations, variations, or improvements thereof.

Processing system 520 includes storage system 521. Processing system 520 retrieves and executes software 530 from storage system 521. In some examples, processing system 520 is located within the same equipment in which network interface 510 is located. In further examples, processing system 520 comprises specialized circuitry, and software 530 or storage system 521 could be included in the specialized circuitry to operate processing system 520 as described herein. Storage system 521 could include a non-transitory computer-readable medium such as a disk, tape, integrated circuit, server, flash memory, phase change memory, magnetic memory, optical memory, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as receive power status information, process power status information, process resource block information, and determine resource block scheduling information, among other operations.

In this example, software 530 includes power monitoring module 531 and resource scheduling module 532. It should be understood that a different configuration could be employed, and individual modules of software 530 could be included in different equipment than resource block management system 500. Power monitoring module 531 receives and monitors power status information, such as detected power, for resource blocks. The power status information could be received from multiple wireless access nodes. Power monitoring module 531 also determines when power status information indicates resource blocks exceed power thresholds. Resource scheduling module 532 communicates with power monitoring module 531 to determine resource block scheduling information. The resource block scheduling information could include increasing or decreasing access or service priorities for user devices, and apportioning user device activity across wireless link resources. The resource block scheduling could occur among different wireless links, sectors, cities, markets, or nationwide, among other regions.

User interface 540 includes equipment and circuitry for receiving user input and control, such as for viewing power status information, and user interfacing with resource scheduling, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 540 also includes equipment to communicate information to a user of resource block management system 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Bus 550 comprises a physical, logical, or virtual communication link, capable of communicating data, control signals, and communications, along with other information. In some examples, bus 550 is encapsulated within the elements of network interface 510, processing system 520, or user interface 540, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Figure 6:
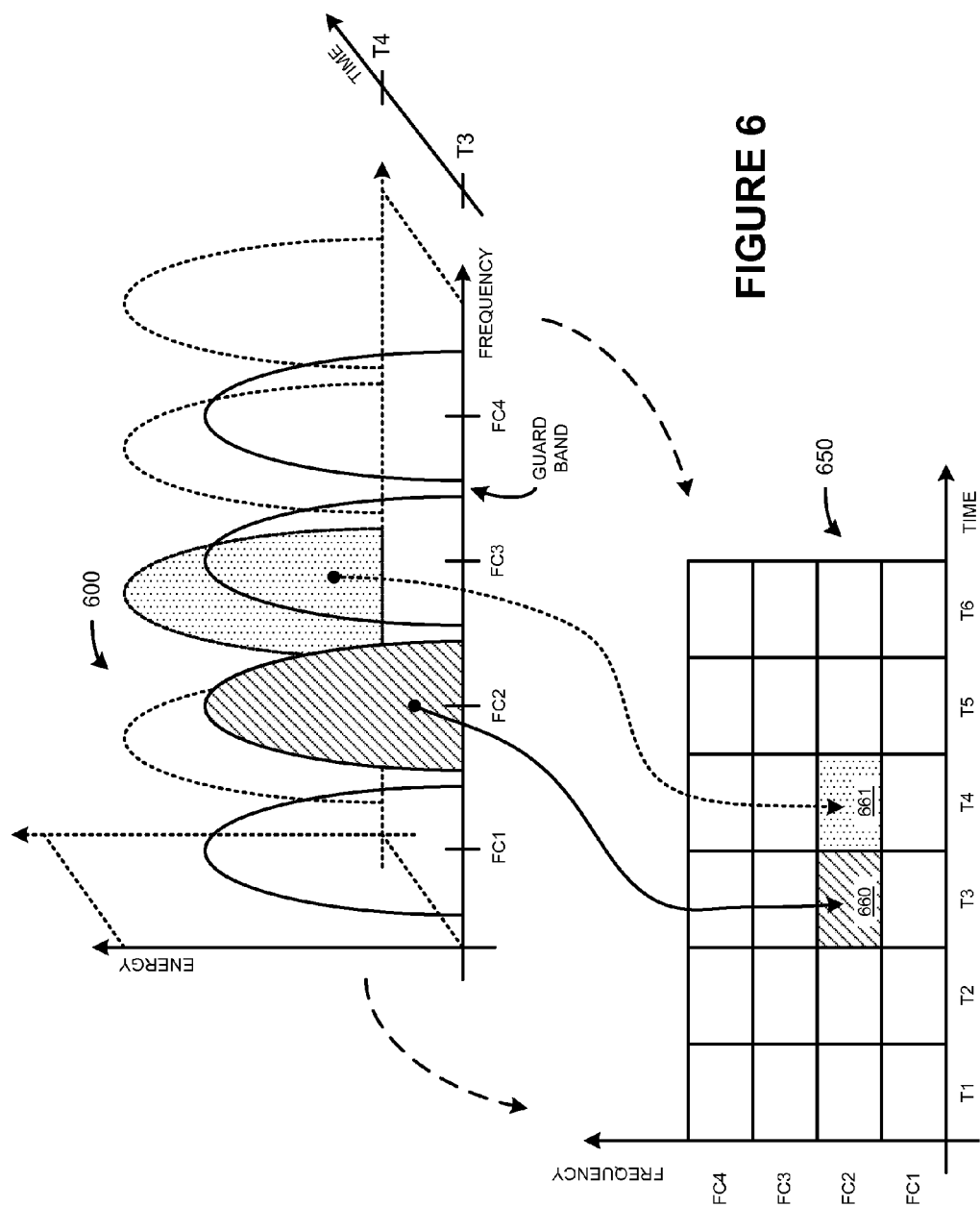
FIG. 6 illustrates graphs of example resource blocks.

FIG. 6 illustrates graphs 600 and 650 of example resource blocks. The resource blocks illustrated in FIG. 6 are examples of the resource blocks discussed in FIGS. 1-5, although other configurations could be used. Graph 600 illustrates a frequency spectrum, where the frequency spectrum is subdivided into four frequency channels, namely FC1-FC4. Each frequency channel is separated from an adjacent frequency channel by a guard band, which is typically determined according the associated wireless communication protocol. The horizontal axis of graph 600 indicates frequency, and the vertical axis indicates energy, which could be indicative of power or data rate in some examples. Also, the frequency channels are further subdivided in time, along a third axis, namely the 'time' axis. Two exemplary timeslots of the frequency channels are shown in graph 600, namely T3 and T4. It should be understood that the number of frequency channels and timeslots in graph 600 are merely exemplary, and a different number or configuration could be used.

Graph 650 illustrates the resource blocks of graph 600. Specifically, each resource block represents a timeslot/frequency channel combination. Shaded ones of the timeslots/frequency channels in graph 600 are shown to correspond to associated resource blocks 660-661 in graph 650 for clarity. The horizontal axis in graph 650 indicates the frequency channel, namely FC1-FC4, and the vertical axis in graph 650 indicates the timeslot, namely T1-T6. Thus, resource blocks are logical combinations of frequency channels and timeslots in this example. In further examples, spreading code-based channelization could be employed instead of, or in addition to, the frequency-based channelization, to create the resource blocks.

In typical examples, the timeslots each represent a particular period of time of use by a user device or base station for each frequency, such as a number of milliseconds of usage for each frequency channel. The timeslots also typically repeat cyclically. In this example, timeslots T1-T6 are each associated with sequential timeslots of a total cycle, where T1, etc. . . . is repeated upon completion of T6. The timeslot duration is typically equal among all timeslots, but variable timeslot durations could be employed.

Referring back to FIG. 1, user devices 140-141 each comprise transceiver circuitry and communication elements. The transceiver circuitry typically includes amplifiers, filters, modulators, and signal processing circuitry. User devices 140-141 may each also include user interface systems, memory devices, non-transitory computer-readable storage mediums, software, processing circuitry, or some other communication components. User devices 140-141 may each be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication network 120 comprises communication and control systems for providing access to communication services for user devices. In some examples, wireless communication network 120 includes equipment to provide wireless access to communication services within different coverage areas to user devices, route communications between content providers and user devices, and receive and process registration and content requests, among other operations. Wireless communication network 120 may also comprise wireless access nodes, wireless access node controllers, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Wireless access node 130 is associated with wireless communication network 120 in this example, and provides wireless links for wireless access to the communication services of wireless communication network 120. Wireless access node 130 comprises RF communication and control circuitry, transceivers, and antennas, as well as wireless communications equipment capable of communicating with and providing wireless access within a wireless coverage area to communication services for wireless communication devices, such as user devices 140-141. The RF communication circuitry typically includes amplifiers, filters, RF modulators, transceivers, and signal processing circuitry. Wireless access node 130 may also comprise a base station or base transceiver station (BTS). In some examples, wireless access node 130 includes power monitoring systems for monitoring and detecting power of wireless links, such as for determining power status information for resource blocks of wireless links.

Communication links 152-153 each use metal, glass, optical, air, space, or some other material as the transport media. Communication links 152-153 could each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 152-153 could each be direct links or may include intermediate networks, systems, or devices, and could each include a logical network link transported over multiple physical links.

Wireless links 150-151 each use the air or space as the transport media. Wireless links 150-151 may each use various protocols, such as Code Division Multiple Access (CDMA), Evolution-Data Optimized (EVDO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although two main wireless links 150-151 are shown in FIG. 1, it should be understood that wireless links 150-151 are merely illustrative to show communication modes or wireless access pathways for each of user device 140-141. In other examples, further wireless links could be shown, with portions of the further wireless links shared and used for different communication sessions and associated overhead communications.

Communication links 150-153 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:

receiving power status information for resource blocks of a plurality of wireless links, wherein the resource blocks comprise frequency apportioned timeslots used for exchanging wireless communications between wireless access nodes and user devices;

processing the power status information to identify hot ones of the resource blocks which exceed a power threshold;

determining scheduling instructions for the resource blocks to reduce the power status information for the hot ones of the resource blocks to below the power threshold by at least identifying donor ones of the resource blocks to offset excessive power of the hot ones of the resource blocks; and transferring the scheduling instructions to at least a first wireless access node for controlling a first wireless link based on the scheduling instructions.

2. The method of claim 1, wherein the power status information for each of the donor ones of the resource blocks indicates power usage below the power threshold.

3. The method of claim 1, wherein identifying the donor ones of the resource blocks comprises identifying individual user devices associated with the donor ones of the resource blocks to receive a reduced usage priority for the donor ones of the resource blocks.

4. The method of claim 1, wherein determining scheduling instructions for the resource blocks comprises identifying donor scheduling instructions for the donor user devices to establish an aggregate power usage below the power threshold for each of the resource blocks, wherein the aggregate power usage is determined across the hot ones of the resource blocks and the donor ones of the resource blocks.

5. The method of claim 1, wherein the plurality of wireless links are employed across at least two different wireless coverage areas, and wherein determining the scheduling instructions for the resource blocks comprises determining the scheduling instructions across the resource blocks of the plurality of wireless links.

6. The method of claim 5, wherein the at least two different wireless coverage areas are selected from at least one of different sectors, different cities, and different markets.

7. The method of claim 1, wherein the resource blocks comprise cyclically repeated frequency apportioned timeslots used for exchanging the wireless communications between the wireless access nodes and the user devices.

8. The method of claim 7, wherein the power status information comprises average detected power for individual ones of the resource blocks during a first quantity of the cyclically repeated frequency apportioned timeslots.

9. The method of claim 1, wherein the power status information comprises instantaneous detected power for each of the resource blocks.

10. A wireless communication system, comprising:
a power monitor system configured to receive power status information for resource blocks of a plurality of wireless links, wherein the resource blocks comprise frequency apportioned timeslots used for exchanging wireless communications between wireless access nodes and user devices;
a resource scheduling system configured to process the power status information to identify hot ones of the resource blocks which exceed a power threshold;
the resource scheduling system configured to determine scheduling instructions for the resource blocks to reduce the power status information for the hot ones of the resource blocks to below the power threshold by at least identifying donor ones of the resource blocks to offset excessive power of the hot ones of the resource blocks; and
the resource scheduling system configured to transfer the scheduling instructions to at least a first wireless access node for controlling a first wireless link based on the scheduling instructions.

11. The wireless communication system of claim 10, wherein the power status information for each of the donor ones of the resource blocks indicates power usage below the power threshold.

12. The wireless communication system of claim 10, wherein the resource scheduling system is configured to identify individual user devices associated with the donor ones of the resource blocks to receive a reduced usage priority for the donor ones of the resource blocks to identify the donor ones of the resource blocks.

13. The wireless communication system of claim 10, wherein the resource scheduling system is configured to identify donor scheduling instructions for the donor user devices to establish an aggregate power usage below the power threshold for each of the resource blocks to determine scheduling instructions for the resource blocks, wherein the aggregate power usage is determined across the hot ones of the resource blocks and the donor ones of the resource blocks.

14. The wireless communication system of claim 10, wherein the plurality of wireless links are employed among at least two different wireless coverage areas, and wherein the resource scheduling system is configured to determine the scheduling instructions among the resource blocks of the plurality of wireless links to determine the scheduling instructions for the resource blocks.

15. The wireless communication system of claim 14, wherein the at least two different wireless coverage areas are selected from at least one of different sectors, different cities, and different markets.

16. The wireless communication system of claim 10, wherein the resource blocks comprise cyclically repeated frequency apportioned timeslots used for exchanging the wireless communications between the wireless access nodes and the user devices.

17. The wireless communication system of claim 16, wherein the power status information comprises average detected power for individual ones of the resource blocks during a first quantity of the cyclically repeated frequency apportioned timeslots.

18. The wireless communication system of claim 10, wherein the power status information comprises instantaneous detected power for each of the resource blocks.

* * * * *